United States Patent
Shah et al.

(10) Patent No.: US 8,401,481 B1
(45) Date of Patent: Mar. 19, 2013

(54) INCREASED WIRELESS COMMUNICATION TRANSMISSIONS IN HETEROGENEOUS NETWORKS

(75) Inventors: Maulik K. Shah, Overland Park, KS (US); Siddharth Oroskar, Overland Park, KS (US); Manoj Shetty, Overland Park, KS (US); Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 77 days.

(21) Appl. No.: 13/075,393

(22) Filed: Mar. 30, 2011

(51) Int. Cl.
*H04B 1/00* (2006.01)
(52) U.S. Cl. ...... 455/63.2; 455/63.1; 455/522; 455/444; 455/453
(58) Field of Classification Search .................. None
See application file for complete search history.

(56) References Cited

U.S. PATENT DOCUMENTS

| | | | | |
|---|---|---|---|---|
| 2003/0190892 | A1* | 10/2003 | Shimada et al. | 455/63.1 |
| 2005/0085254 | A1* | 4/2005 | Chuah et al. | 455/522 |
| 2010/0008244 | A1 | 1/2010 | Sampath et al. | |
| 2010/0323745 | A1* | 12/2010 | Chen et al. | 455/522 |
| 2011/0317574 | A1* | 12/2011 | Richardson | 370/252 |
| 2012/0108177 | A1* | 5/2012 | Miao et al. | 455/67.11 |
| 2012/0113961 | A1* | 5/2012 | Krishnamurthy | 370/332 |
| 2012/0142392 | A1* | 6/2012 | Patel et al. | 455/522 |

\* cited by examiner

*Primary Examiner* — Rafael Pérez-Gutiérrez
*Assistant Examiner* — German Viana Di Prisco

(57) ABSTRACT

A wireless communication system comprises a macrocell base station and a communication control system, wherein picocell base stations inhibit wireless communications during a first set of time slots and transfer the wireless communications during a second set of the time slots. The macrocell base station is configured to transfer wireless communication signals at a first power level to a plurality of wireless communication devices during the first set of the time slots. The communication control system configured to determine a quantity of the wireless communication devices that are within a distance threshold of the macrocell base station. The macrocell base station is configured to transfer additional wireless communication signals at a second power level during the second set of the time slots to at least some of the wireless communication devices if the quantity exceeds a quantity threshold.

20 Claims, 7 Drawing Sheets

INCREASED WIRELESS COMMUNICATION TRANSMISSIONS IN HETEROGENEOUS NETWORKS

TECHNICAL BACKGROUND

The demand for high-speed wireless communication services continues to rise. In response to this increased demand, wireless communication service providers may deploy heterogeneous networks as an efficient way to improve system capacity and enhance network coverage. A heterogeneous network contains wireless access nodes that have different characteristics, such as transmission power and radio frequency (RF) coverage areas. For example, a wireless coverage area provided by a macrocell base station may be supplemented by many smaller, low-power nodes, such as femtocells, picocell base stations, and relay nodes.

However, the larger footprint of a macrocell base station often encompasses the relatively smaller coverage areas of picocell base stations in a heterogeneous network. Thus, in situations where the picocell base stations share the same RF spectrum as the macrocell base station, strong interference may be introduced to wireless signals transmitted by the picocell base stations. To curb the deleterious effects of such interference, time-domain resource partitioning schemes may be utilized in heterogeneous networks. Time-domain partitioning typically reserves certain subframes for the macrocell base station and reserves other subframes for the picocell base stations. In this manner, a higher signal-to-interference-plus-noise ratio (SINR) is achieved in reserved subframes for both the macrocell base station and picocell base stations, which enables higher data rates for wireless communications transmitted to user communication devices.

OVERVIEW

A method of operating a wireless communication system is disclosed, wherein picocell base stations inhibit wireless communications during a first set of time slots and transfer the wireless communications during a second set of the time slots. The method comprises, in a macrocell base station, transferring wireless communication signals at a first power level to a plurality of wireless communication devices during the first set of the time slots. The method further comprises, in a communication control system, determining a quantity of the wireless communication devices that are within a distance threshold of the macrocell base station. The method further comprises, in the macrocell base station, transferring additional wireless communication signals at a second power level during the second set of the time slots to at least some of the wireless communication devices if the quantity exceeds a quantity threshold.

A wireless communication system comprises a macrocell base station and a communication control system, wherein picocell base stations inhibit wireless communications during a first set of time slots and transfer the wireless communications during a second set of the time slots. The macrocell base station is configured to transfer wireless communication signals at a first power level to a plurality of wireless communication devices during the first set of the time slots. The communication control system configured to determine a quantity of the wireless communication devices that are within a distance threshold of the macrocell base station. The macrocell base station is configured to transfer additional wireless communication signals at a second power level during the second set of the time slots to at least some of the wireless communication devices if the quantity exceeds a quantity threshold.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
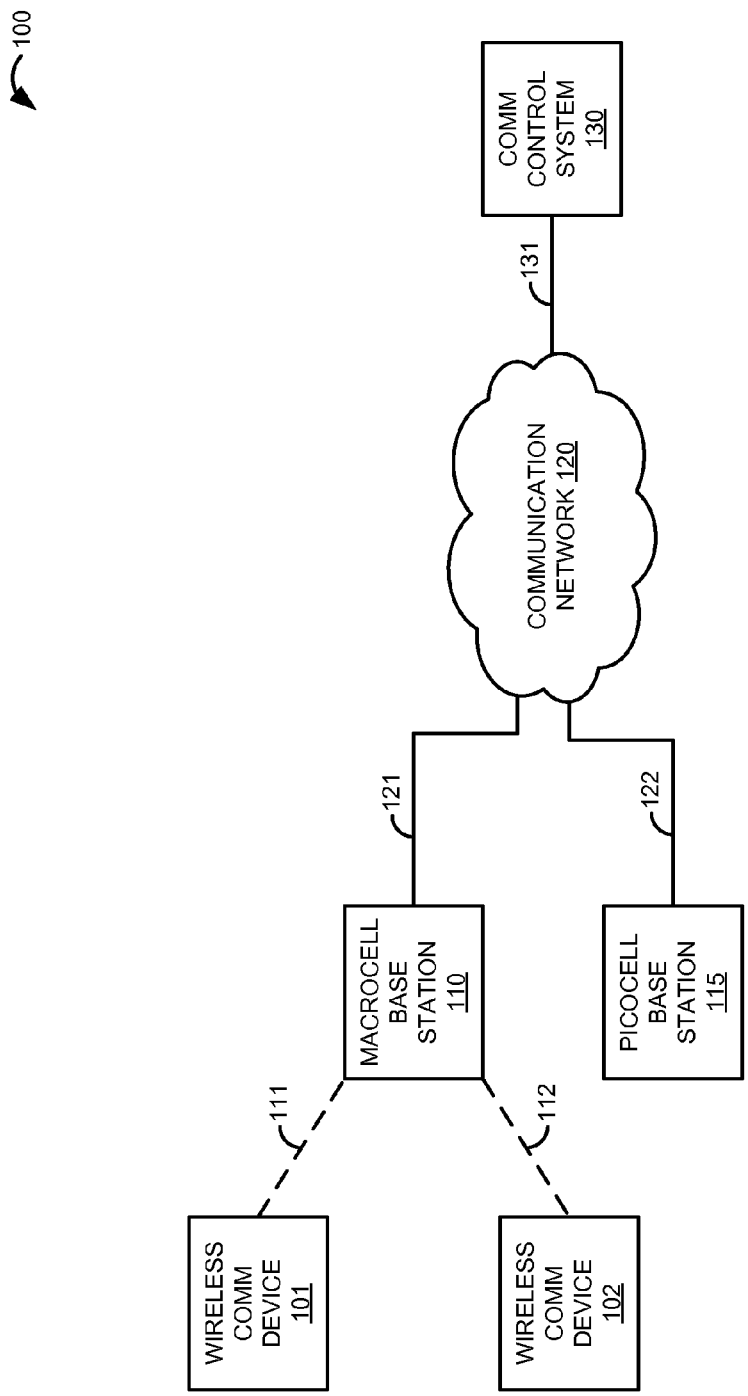
FIG. 1 is a block diagram that illustrates a communication system.

FIG. 1 is a block diagram that illustrates communication system 100. Communication system 100 includes wireless communication devices 101 and 102, macrocell base station 110, picocell base station 115, communication network 120, and communication control system 130. Wireless communication device 101 and macrocell base station 110 are in communication over wireless communication link 111. Likewise, wireless communication device 102 and macrocell base station 110 communicate over wireless communication link 112. Macrocell base station 110 and communication network 120 are in communication over communication link 121. Picocell base station 115 and communication network 120 are in communication over communication link 122. Communication network 120 and communication control system 130 communicate over communication link 131.

Figure 2:
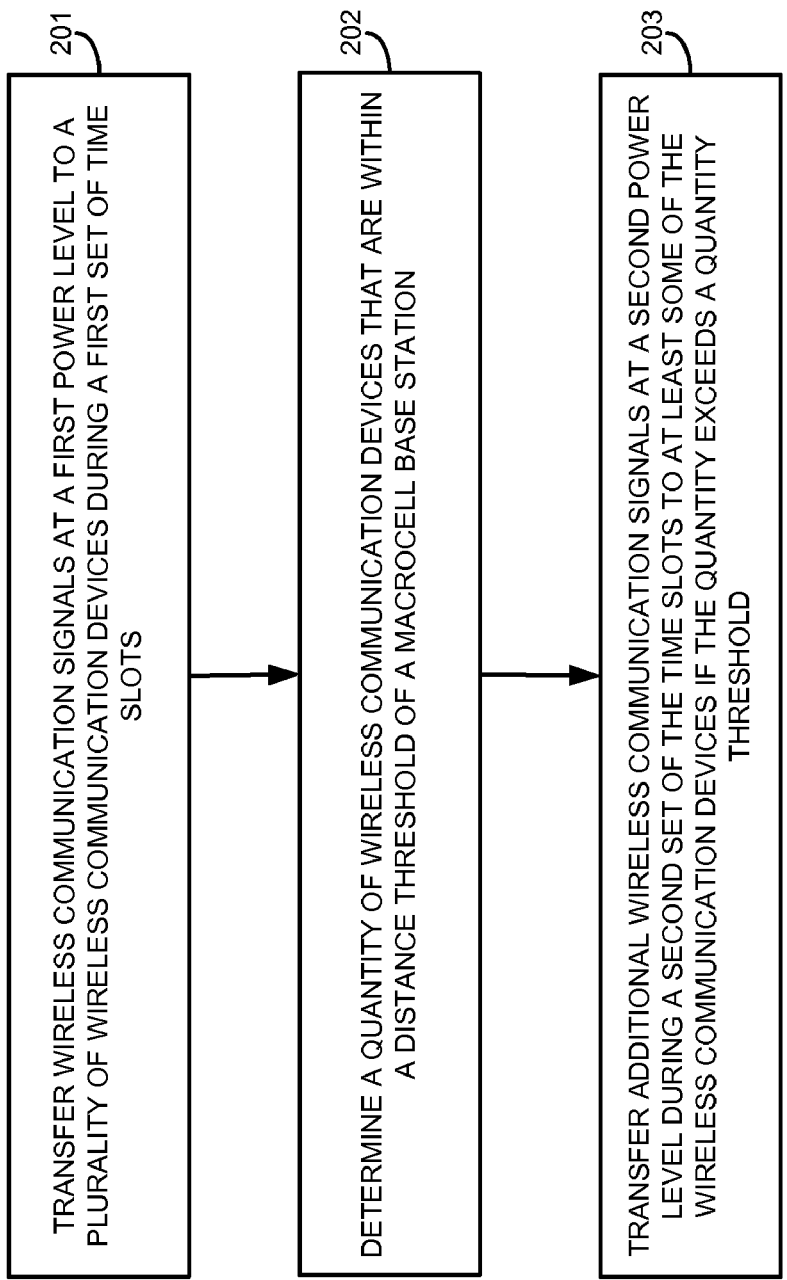
FIG. 2 is a flow diagram that illustrates an operation of the communication system.

FIG. 2 is a flow diagram that illustrates an operation of communication system 100. The steps of the operation are indicated below parenthetically. In communication system 100, picocell base station 115 inhibits wireless communications during a first set of time slots and transfers the wireless communications during a second set of the time slots. For example, picocell base station 115 may refrain from transmitting wireless communications during a first set of odd-numbered time slots and instead transmit the wireless communications during a second set of even-numbered time slots.

Macrocell base station 110 transfers wireless communication signals at a first power level to a plurality of wireless communication devices 101 and 102 during the first set of the time slots (201). As discussed above, the first set of the time slots could comprise odd-numbered time slots, although macrocell base station 110 would typically transfer the wireless communication signals more frequently than simply alternating time slots with picocell base station 115. In some examples, the first power level could comprise a maximum power level of macrocell base station 110. Typically, macrocell base station 110 has a greater range of coverage than picocell base station 115. In addition, picocell base station 115 and macrocell base station 110 typically have overlapping coverage areas.

Communication control system 130 determines a quantity of the wireless communication devices 101 and 102 that are within a distance threshold of macrocell base station 110 (202). In some examples, communication control system 130 could determine the quantity of the wireless communication devices 101 and 102 that are within the distance threshold of macrocell base station 110 based on round trip delay measurements. For example, to determine the quantity of wireless communication devices 101 and 102 that are within the distance threshold, communication control system 130 could first determine the distances between macrocell base station 110 and each wireless communication device 101 and 102 based on a round trip delay between either device 101 or 102 and macrocell base station 110, and then compare those distances to the distance threshold. Additionally or alternatively, communication control system 130 could utilize a variety of other techniques to determine the distance between a wireless communication device 101 or 102 and macrocell base station 110. In some examples, communication control system 130 could determine these distances based on the respective locations of wireless communication devices 101 and 102 and macrocell base station 110. For example, communication control system 130 could request that wireless communication devices 101 and 102 provide their respective locations, and devices 101 and 102 could determine their locations based on a global positioning system, triangulation, multilateration, or any other location determination technique. Based on the known location of macrocell base station 110, communication control system 130 could then determine the respective distances between each wireless communication device 101-102 and macrocell base station 110.

Once the respective distances between wireless communication devices 101-102 and macrocell base station 110 are known, communication control system 130 may determine the quantity of the wireless communication devices 101 and 102 that are within the distance threshold of macrocell base station 110. The distance threshold is typically predetermined for macrocell base station 110, although the distance threshold could be determined dynamically in some examples. To determine the quantity of the wireless communication devices 101 and 102 that are within the distance threshold of macrocell base station 110, communication control system 130 could compare the distances to the distance threshold and count the number of devices 101 and 102 that fall within the distance threshold. For example, if the distance threshold is one mile, and the distances between wireless communication devices 101-102 and macrocell base station 110 are both less than one mile, communication control system 130 would determine a quantity of two wireless communication devices 101 and 102 that are within the distance threshold of macrocell base station 110. Of course, one of skill in the art will understand that references to values falling within and/or exceeding a threshold as used herein could be either inclusive or exclusive of the threshold value depending on design decisions.

Macrocell base station 110 transfers additional wireless communication signals at a second power level during the second set of the time slots to at least some of the wireless communication devices 101 and 102 if the quantity exceeds a quantity threshold (203). In some examples, the second power level is lower than the first power level. To determine if the quantity of the wireless communication devices 101 and 102 that are within the distance threshold of macrocell base station 110 exceeds a quantity threshold, communication control system 130 could compare the quantity of devices 101 and 102 that are within the distance threshold to the quantity threshold, and configure macrocell base station 110 to transfer the additional wireless communication signals at the second power level during the second set of timeslots if the quantity exceeds the quantity threshold. The quantity threshold is typically predetermined for macrocell base station 110, although in some examples, the quantity threshold could be determined dynamically. Communication control system 130 could also select the second power level for macrocell base station 110 based on the quantity of the wireless communication devices 101 and 102 that are within the distance threshold of macrocell base station 110 in some examples. Macrocell base station 110 may then transfer the additional wireless communication signals at the second power level during the second set of the time slots to at least some of the wireless communication devices 101 and 102 if the quantity exceeds the quantity threshold, which could comprise transferring the additional wireless communication signals to the wireless communication devices 101 and 102 that are within the distance threshold of the macrocell base station 110 in some examples.

Advantageously, macrocell base station 110 transfers wireless communication signals to wireless communication devices 101 and 102 at a first power level during a first set of time slots, and may transfer additional wireless communication signals at a second power level during a second set of the time slots to at least some of the wireless communication devices 101 and 102 if a quantity of the devices 101 and 102 that are within a distance threshold of base station 110 exceeds a quantity threshold. Although picocell base station 115 also transfers wireless communications during the second set of the time slots, interference to these wireless communications caused by the simultaneous transmission of wireless communication signals by macrocell base station 110 can be minimized if macrocell base station 110 utilizes a lower power level. In this manner, wireless communication devices 101 and 102 will experience higher data throughput by receiving the wireless communication signals during both the first and second sets of the timeslots without negatively impacting the signal quality of picocell base station 115, thereby improving efficiency in the utilization of system resources.

Referring back to FIG. 1, wireless communication devices 101 and 102 individually comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101 and 102 may also include a user interface, memory system, software, processing circuitry, or some other communication components. For example, wireless communication devices 101 and 102 could each comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101 and 102 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication devices 101-102 and macrocell base station 110.

Macrocell base station 110 comprises RF communication circuitry and an antenna. The RF communication circuitry typically includes an amplifier, filter, RF modulator, and signal processing circuitry. Macrocell base station 110 may also comprise a router, server, memory device, software, processing circuitry, cabling, power supply, network communication interface, structural support, or some other communication apparatus. Macrocell base station 110 could comprise a wireless access node, Internet access node, telephony service node, wireless data access point, or some other wireless communication system—including combinations thereof. Some examples of macrocell base station 110 include a base transceiver station (BTS), base station controller (BSC), radio base station (RBS), Node B, enhanced Node B (eNodeB), and others—including combinations thereof. Wireless network protocols that may be utilized by macrocell base station 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. In some examples, macrocell base station 110 provides the widest range of cell sizes relative to other base stations, such as picocell base stations, microcell base stations, and femtocell base stations.

Picocell base station 115 comprises RF communication circuitry and an antenna. The RF communication circuitry typically includes an amplifier, filter, RF modulator, and signal processing circuitry. Picocell base station 115 may also comprise a router, server, memory device, software, processing circuitry, cabling, power supply, network communication interface, structural support, or some other communication apparatus. Picocell base station 115 could comprise a wireless access node, Internet access node, telephony service node, wireless data access point, or some other wireless communication system—including combinations thereof. Some examples of picocell base station 115 include a base transceiver station (BTS), base station controller (BSC), radio base station (RBS), Node B, enhanced Node B (eNodeB), home-evolved Node B (HeNB), closed subscriber group (CSG) cell, relay node, and others—including combinations thereof. Wireless network protocols that may be utilized by picocell base station 115 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Picocell base station 115 typically provides a lesser range of wireless coverage than macrocell base station 110. In some examples, picocell base station 115 may provide a wireless coverage range of two hundred meters or less. However, in some examples picocell base station 115 could comprise a microcell base station and/or a femtocell base station. Typically, a microcell base station may provide a wireless coverage range of roughly two kilometers, and a femtocell base station may provide a ten meter range of wireless coverage.

Communication network 120 comprises the core network of a wireless communication service provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 120 may be configured to communicate over metallic, wireless, or optical links—including combinations thereof. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Communication control system 130 comprises a processing system and communication transceiver. Communication control system 130 may also include other components such as a router, server, data storage system, and power supply. Communication control system 130 may reside in a single device or may be distributed across multiple devices. Communication control system 130 may be a discrete system or may be integrated within other systems—including other systems within communication system 100. For example, although communication control system 130 is shown external to macrocell base station 110 in FIG. 1, in some examples communication control system 130 could be included within the equipment comprising macrocell base station 110. In some examples, communication control system 130 could comprise a base station controller, network switch, mobile switching center, router, switching system, packet gateway, network gateway system, Internet access node, application server, service node, firewall, or some other communication system—including combinations thereof.

Wireless communication links 111 and 112 use the air or space as the transport medium. Wireless communication links 111 and 112 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111 and 112 may individually comprise many different signals sharing the same link. For example, wireless communication links 111 and 112 could include multiple signals operating in a single propagation path comprising multiple communication sessions, frequencies, timeslots, transportation ports, logical transportation links, network sockets, IP sockets, packets, or communication directions—including combinations thereof.

Communication links 121, 122, and 131 use metal, air, space, optical fiber such as glass or plastic, or some other material as the transport medium—including combinations thereof. Communication links 121, 122, and 131 could use various communication protocols, such as TDM, IP, Ethernet, telephony, optical networking, hybrid fiber coax (HFC), communication signaling, wireless protocols, or some other communication format—including combinations thereof. Communication links 121, 122, and 131 may be direct links or could include intermediate networks, systems, or devices.

Figure 3:
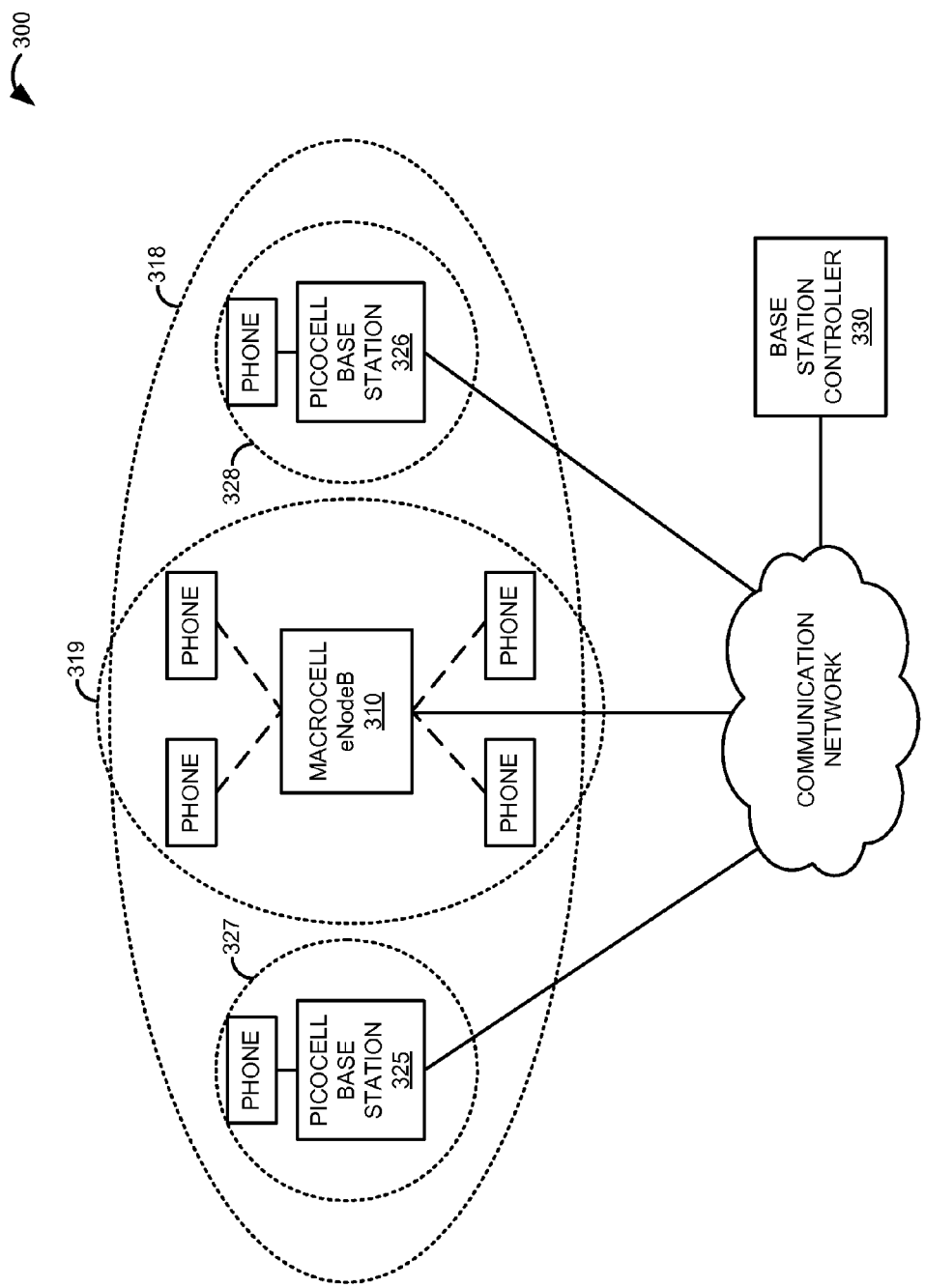
FIG. 3 is a block diagram that illustrates a communication system in an exemplary embodiment.

FIG. 3 is a block diagram that illustrates communication system 300 in an exemplary embodiment. In this example, communication system 300 comprises an LTE Advanced heterogeneous network. Communication system 300 includes macrocell eNodeB 310, picocell base stations 325-326, and base station controller (BSC) 330. Macrocell eNodeB 310 provides an example of macrocell base station 110 and BSC 330 provides and example of communication control system 130, although base station 110 and system 130 may use alternative configurations. The phones appearing in communication system 300 represent 4G smartphones or some other 4G wireless communication devices. Each of the base stations 310, 325, and 326 has approximate wireless coverage areas as indicated by the dotted lines on FIG. 3. In particular, picocell base station 325 provides wireless coverage area 327, while picocell base station 326 provides wireless coverage area 328. Macrocell eNodeB 310 has a larger coverage area 318 provided by a maximum power level of eNodeB 310, which overlaps with the coverage areas 327 and 328 of respective picocell base stations 325 and 326. In addition, macrocell eNodeB 310 has a smaller coverage area 319 provided by a lower power level of eNodeB 310. Note that macrocell eNodeB 310 would not typically transmit at both the maximum power level and the lower power level, so only one of the coverage areas 318 and 319 would be provided by macrocell eNodeB 310 at a given time.

Figure 4:
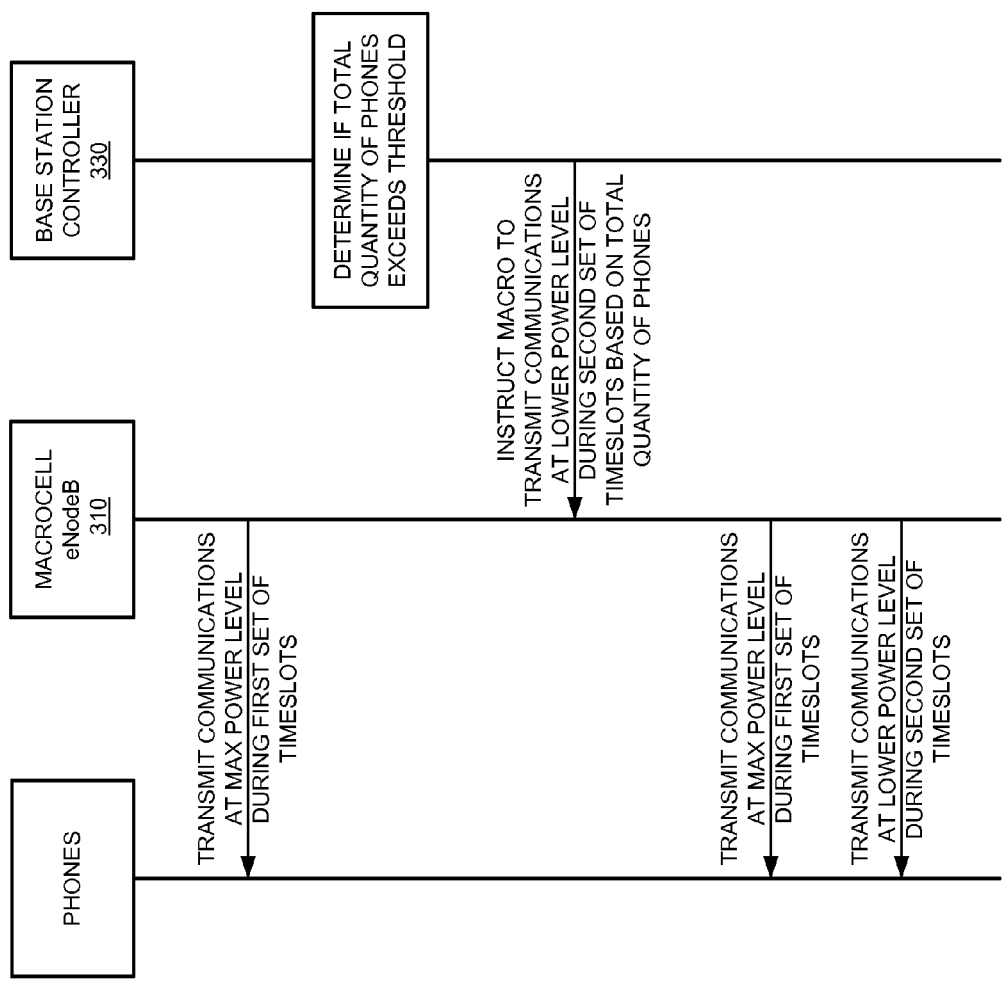
FIG. 4 is a sequence diagram that illustrates an operation of the communication system in an exemplary embodiment.

FIG. 4 is a sequence diagram that illustrates an operation of communication system 300 in an exemplary embodiment. Due to the close proximity of neighboring picocell base stations 325 and 326 to macrocell eNodeB 310, these base stations 310, 325, and 326 perform time-domain resource partitioning to prevent strong interference that would otherwise occur if communications were simultaneously transmitted. Accordingly, macrocell eNodeB 310 transmits wireless communications at its maximum power level during a first set of time slots, which provides the full coverage range 318 as shown in FIG. 3 during these subframes. During a second set of the timeslots, macrocell eNodeB 310 initially refrains from transmitting communications, reserving this second set of subframes for the neighboring picocell base stations 325 and 326 to transmit communications to the phones within their respective coverage areas 327 and 328. While this time-domain resource partitioning scheme provides a higher signal-to-interference-plus-noise ratio (SINR) in the second set of subframes reserved for picocell base stations 325 and 326, network efficiency is reduced due to the blank timeslots endured by both the macrocell eNodeB 310 and picocell base stations 325 and 326.

However, instead of blanking the reserved timeslots completely, macrocell eNodeB 310 could transmit communications during these subframes at a lower power level than its maximum power and still avoid interfering with the transmissions of picocell base stations 325 and 326. In this example, BSC 330 is configured to instruct macrocell eNodeB 310 to transmit communications at a lower power level during the timeslots reserved for picocell base stations 325 and 326 when a threshold quantity of three or more phones are served by macrocell eNodeB 310. For example, if eNodeB 310 is only serving a single smartphone, there would be little benefit to transmitting communications during subframes reserved for picocell base stations 325 and 326, so eNodeB 310 would continue to blank the reserved subframes in this case. However, as shown in FIG. 3, there are actually four smartphones presently being served by macrocell eNodeB 310 in this example, which exceeds the threshold quantity of three devices, so BSC 330 instructs eNodeB 310 to transmit communications to these four phones at a lower power level during the second set of timeslots based on the total quantity of four phones exceeding the threshold.

In this example, based on the locations of the phones served by macrocell eNodeB 310 and the known locations of picocell base stations 325 and 326, BSC 330 selects a power level for eNodeB 310 that will provide enough range to reach the phones served by eNodeB 310 but will not encroach the coverage areas 327 and 328 of respective picocell base stations 325 and 326. Thus, macrocell eNodeB 310 transmits at the selected power level during the second set of timeslots that are normally reserved for picocell base stations 325 and 326, resulting in a reduced coverage area 319 for macrocell eNodeB 310 during these subframes. During the first set of timeslots reserved for macrocell eNodeB 310, the full coverage area 318 is still provided by eNodeB 310 by transmitting at full power during this first set of subframes. In this manner, macrocell eNodeB 310 may transmit communications more frequently without introducing strong interference to users of picocell base stations 325 and 326, thereby improving network resource efficiency.

Figure 5:
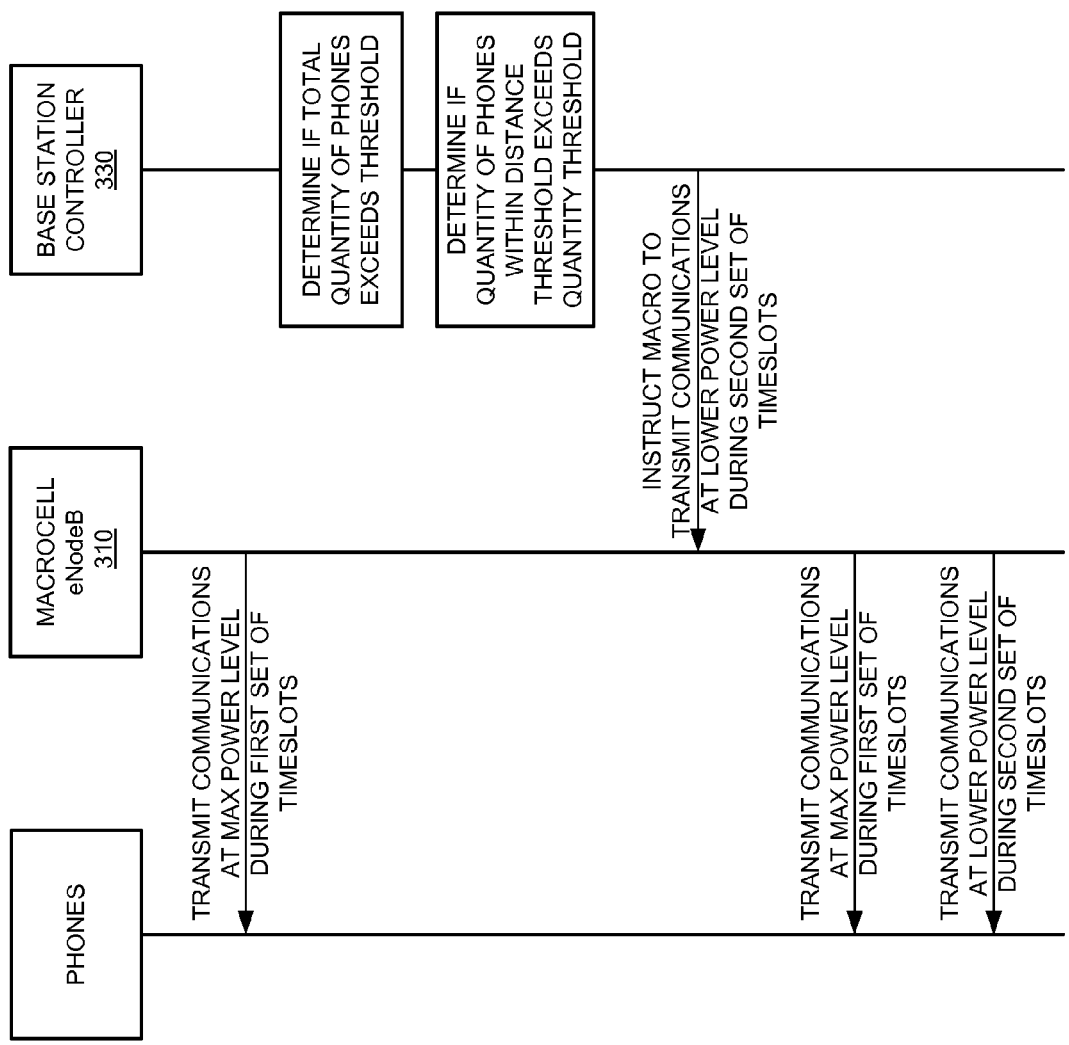
FIG. 5 is a sequence diagram that illustrates an operation of the communication system in an exemplary embodiment.

FIG. 5 is a sequence diagram that illustrates an operation of communication system 300 in an exemplary embodiment. The operation of FIG. 5 is similar to the operation of FIG. 4, except that BSC 330 is configured to determine additional threshold constraints prior to instructing eNodeB 310 to transmit communications during subframes otherwise reserved for picocell base stations 325 and 326 under a time-domain resource partitioning scheme.

The operation of FIG. 5 begins when macrocell eNodeB 310 transmits wireless communications at a maximum power level during a first set of timeslots reserved for eNodeB 310, and refrains from transmitting communications during a second set of timeslots reserved for picocell base stations 325 and 326. As a precursor to instructing eNodeB 310 to commence transmissions at a lower power level during the subframes reserved for picocell base stations 325 and 325, BSC 330 first determines if a total quantity of smartphones served by macrocell eNodeB 310 exceeds a total quantity threshold. In this case, the total quantity threshold is two, and since macrocell eNodeB 310 is presently serving four phones as shown in FIG. 3, this initial condition is satisfied. If the total quantity threshold were not met, macrocell eNodeB 310 would continue to only transmit communications during the first set of timeslots and inhibit communications during the second set of timeslots reserved for picocell base stations 325 and 326.

However, since the total quantity threshold is met in this example, BSC 330 proceeds to determine if the quantity of phones within a distance threshold to macrocell eNodeB 310 exceeds a quantity threshold. To perform this determination, BSC 330 first determines the respective distances between macrocell eNodeB 310 and each of the phones served by eNodeB 310 and compares these distances to a distance threshold. Those smartphones that are within close enough proximity to macrocell eNodeB 310 to satisfy the distance threshold are then counted by BSC 330 and compared to a quantity threshold to determine whether eNodeB 310 should transmit to these phones at a lower power level during subframes reserved for picocell base stations 325 and 326. In this example, the quantity threshold is three or more phones, and three of the four phones served by macrocell base station 310 are within the distance threshold, so the quantity threshold is met. Therefore, BSC 330 instructs macrocell eNodeB 310 to transmit communications at a lower power level during a second set of the timeslots that would be otherwise reserved for picocell base stations 325 and 326.

Based on the instructions received from BSC 330, macrocell eNodeB 310 transmits communications at the maximum power level during the first set of timeslots reserved for eNodeB 310, which provides coverage area 318, and transmits additional wireless communications during the second set of timeslots at a lower power level, which provides the smaller wireless coverage area 319 as shown in FIG. 3. Advantageously, since macrocell eNodeB 310 no longer blanks the subframes that were reserved for picocell base stations 325 and 326, the smartphones served by eNodeB 310 receive greater communication throughput and enjoy improved communication service. In addition, one of skill in the art will understand the techniques described above could equally apply to picocell base stations 325 and 326, so that picocell base stations 325 and 326 could transmit additional communications at reduced power levels during the first set of subframes reserved for macrocell eNodeB 310 without introducing substantial interference.

Figure 6:
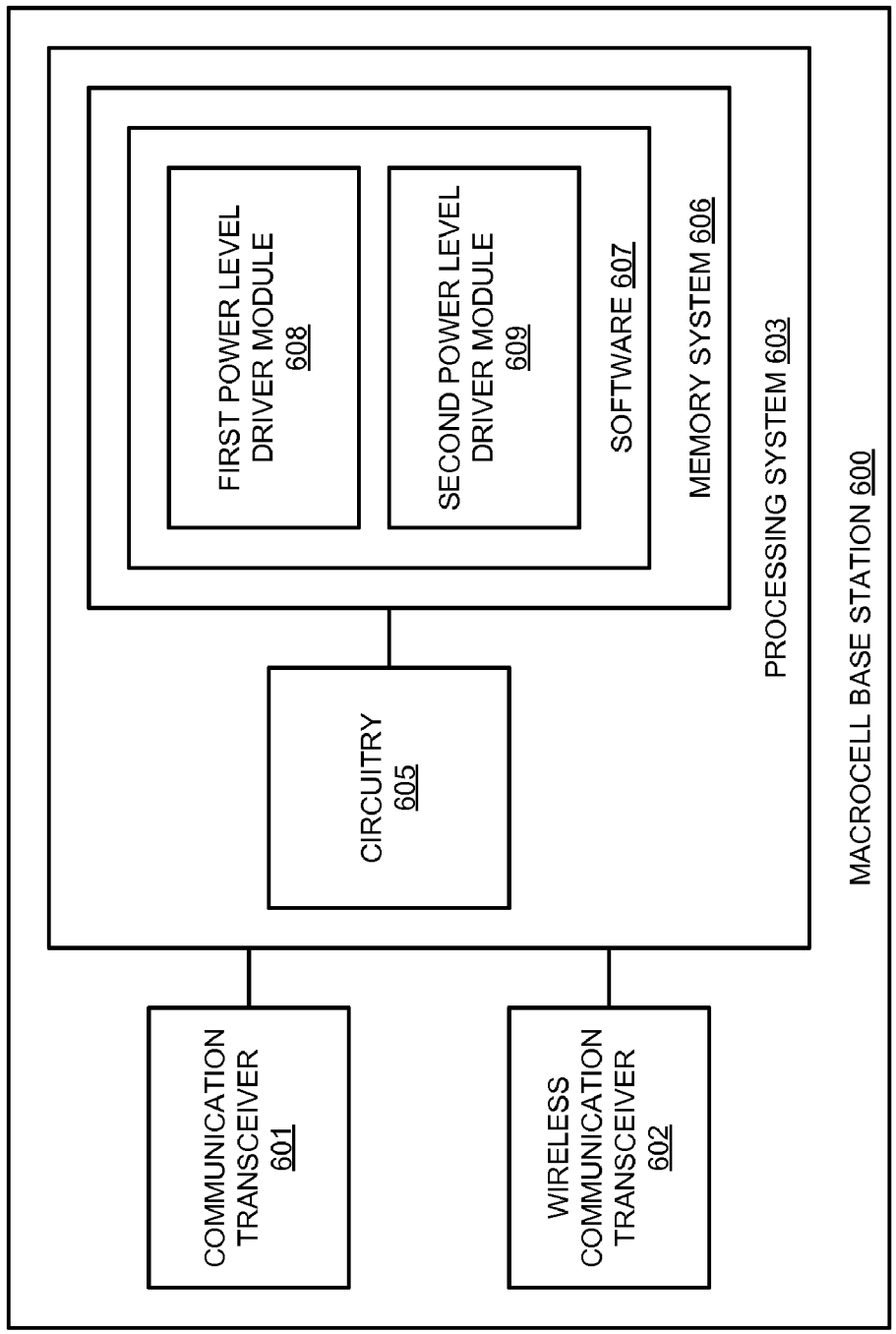
FIG. 6 is a block diagram that illustrates a macrocell base station.

FIG. 6 is a block diagram that illustrates macrocell base station 600. Macrocell base station 600 provides an example of macrocell base station 110, although base station 110 may use alternative configurations. Macrocell base station 600 comprises communication transceiver 601, wireless communication transceiver 602, and processing system 603. Processing system 603 is linked to communication transceiver 601 and wireless communication transceiver 602. Processing system 603 includes processing circuitry 605 and memory system 606 that stores operating software 607. Operating software 607 comprises software modules 608 and 609.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof.

Wireless communication transceiver 602 comprises RF communication circuitry and an antenna. The RF communication circuitry typically includes an amplifier, filter, RF modulator, and signal processing circuitry. Wireless communication transceiver 602 may also include a memory system, software, processing circuitry, or some other communication device. Wireless communication transceiver 602 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other wireless communication format. Wireless communication transceiver 602 is configured to transfer wireless communication signals at a first power level to a plurality of wireless communication devices during a first set of time slots, and transfer additional wireless communication signals at a second power level during a second set of the time slots to at least some of the wireless communication devices if a quantity of the wireless communication devices that are within a distance threshold of macrocell base station 600 exceeds a quantity threshold.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608 and 609, although software 607 could have alternative configurations in other examples.

When executed by circuitry 605, operating software 607 directs processing system 603 to operate as described herein for macrocell base station 110. In particular, operating software 607 may direct processing system 603 to direct wireless communication transceiver 602 to transfer wireless communication signals at a first power level to a plurality of wireless communication devices during a first set of time slots. Further, operating software 607 may direct processing system 603 to direct wireless communication transceiver 602 to transfer additional wireless communication signals at a second power level during a second set of the time slots to at least some of the wireless communication devices if a quantity of the wireless communication devices that are within a distance threshold of macrocell base station 600 exceeds a quantity threshold.

In this example, operating software 607 comprises a first power level driver software module 608 that transfers wireless communication signals at a first power level to a plurality of wireless communication devices during a first set of time slots. Operating software 607 also comprises a second power level driver software module 609 that transfers additional wireless communication signals at a second power level during a second set of the time slots to at least some of the wireless communication devices if a quantity of the wireless communication devices that are within a distance threshold of macrocell base station 600 exceeds a quantity threshold.

Figure 7:
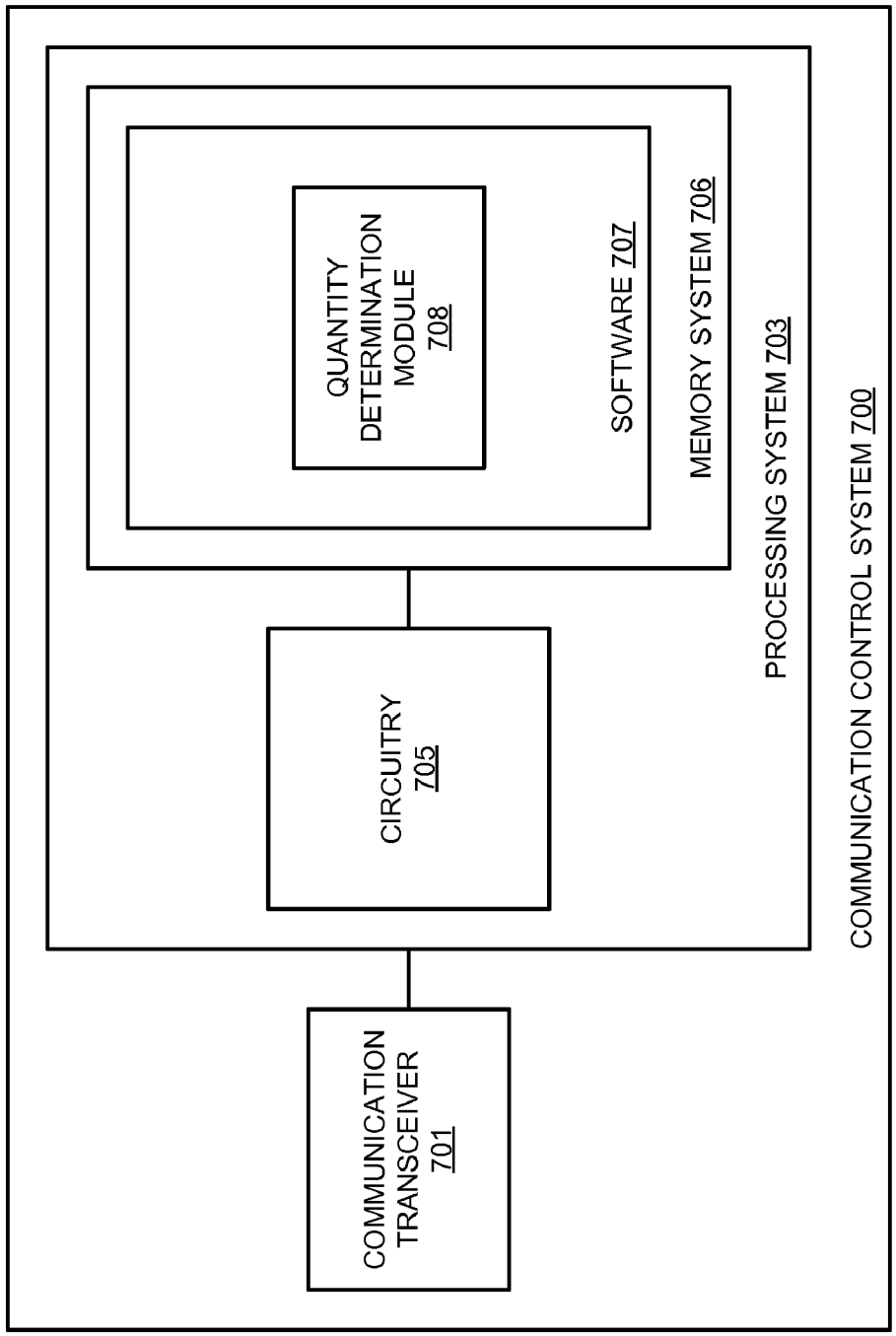
FIG. 7 is a block diagram that illustrates a communication control system.

FIG. 7 is a block diagram that illustrates communication control system 700. Communication control system 700 provides an example of communication control system 130, although system 130 may use alternative configurations. Communication control system 700 comprises communication transceiver 701 and processing system 703. Processing system 703 is linked to communication transceiver 701. Processing system 703 includes processing circuitry 705 and memory system 706 that stores operating software 707. Operating software 707 comprises software module 708.

Communication transceiver 701 comprises components that communicate over communication links, such as network cards, ports, RF transceivers, processing circuitry and software, or some other communication components. Communication transceiver 701 may be configured to communicate over metallic, wireless, or optical links. Communication transceiver 701 may be configured to use TDM, IP, Ethernet, optical networking, wireless protocols, communication signaling, or some other communication format—including combinations thereof.

Processing circuitry 705 comprises microprocessor and other circuitry that retrieves and executes operating software 707 from memory system 706. Processing circuitry 705 may comprise a single device or could be distributed across multiple devices—including devices in different geographic areas. Processing circuitry 705 may be embedded in various types of equipment. Memory system 706 comprises a non-transitory computer readable storage medium, such as a disk drive, flash drive, data storage circuitry, or some other hardware memory apparatus. Memory system 706 may comprise a single device or could be distributed across multiple devices—including devices in different geographic areas. Memory system 706 may be embedded in various types of equipment. Operating software 707 comprises computer programs, firmware, or some other form of machine-readable processing instructions. Operating software 707 may include an operating system, utilities, drivers, network interfaces, applications, or some other type of software. In this example, operating software 707 comprises quantity determination software module 708, although software 707 could have alternative configurations in other examples.

When executed by circuitry 705, operating software 707 directs processing system 703 to operate as described herein for communication control system 130. In particular, operating software 707 directs processing system 703 to determine a quantity of wireless communication devices that are within a distance threshold of a macrocell base station.

In this example, operating software 707 comprises a quantity determination software module 708 that determines a quantity of wireless communication devices that are within a distance threshold of a macrocell base station.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, wherein picocell base stations inhibit wireless communications during a first set of time slots and transfer the wireless communications during a second set of the time slots, the method comprising:
   in a macrocell base station, transferring wireless communication signals at a first power level to a plurality of wireless communication devices during the first set of the time slots;
   in a communication control system, determining a quantity of the wireless communication devices that are within a distance threshold of the macrocell base station; and
   in the macrocell base station, transferring additional wireless communication signals at a second power level during the second set of the time slots to at least some of the wireless communication devices if the quantity exceeds a quantity threshold.

2. The method of claim 1 wherein the second power level is lower than the first power level.

3. The method of claim 1 further comprising selecting the second power level based on the quantity of the wireless communication devices that are within the distance threshold of the macrocell base station.

4. The method of claim 1 wherein, in the communication control system, determining the quantity of the wireless communication devices that are within the distance threshold of the macrocell base station comprises determining the quantity of the wireless communication devices that are within the distance threshold of the macrocell base station after determining if a total quantity of the wireless communication devices exceed a total quantity threshold.

5. The method of claim 1 wherein determining the quantity of the wireless communication devices that are within the distance threshold of the macrocell base station comprises determining the quantity of the wireless communication devices that are within the distance threshold of the macrocell base station based on round trip delay measurements.

6. The method of claim 1 wherein transferring the additional wireless communication signals at the second power level during the second set of the time slots to at least some of the wireless communication devices if the quantity exceeds the quantity threshold comprises transferring the additional wireless communication signals to the wireless communication devices that are within the distance threshold of the macrocell base station.

7. The method of claim 1 wherein the picocell base stations and the macrocell base station have overlapping coverage areas.

8. The method of claim 1 wherein the macrocell base station has a greater range of coverage than the picocell base stations.

9. The method of claim 1 wherein the first power level comprises a maximum power level of the macrocell base station.

10. The method of claim 1 wherein the picocell base stations comprise a microcell base station.

11. A wireless communication system, wherein picocell base stations inhibit wireless communications during a first set of time slots and transfer the wireless communications during a second set of the time slots, the system comprising:
   a macrocell base station configured to transfer wireless communication signals at a first power level to a plurality of wireless communication devices during the first set of the time slots;
   a communication control system configured to determine a quantity of the wireless communication devices that are within a distance threshold of the macrocell base station; and
   the macrocell base station configured to transfer additional wireless communication signals at a second power level during the second set of the time slots to at least some of the wireless communication devices if the quantity exceeds a quantity threshold.

12. The system of claim 11 wherein the second power level is lower than the first power level.

13. The system of claim 11 wherein the communication control system is configured to select the second power level based on the quantity of the wireless communication devices that are within the distance threshold of the macrocell base station.

14. The system of claim 11 wherein the communication control system configured to determine the quantity of the wireless communication devices that are within the distance threshold of the macrocell base station comprises the communication control system configured to determine the quantity of the wireless communication devices that are within the distance threshold of the macrocell base station after determining if a total quantity of the wireless communication devices exceed a total quantity threshold.

15. The system of claim 11 wherein the communication control system configured to determine the quantity of the wireless communication devices that are within the distance threshold of the macrocell base station comprises the communication control system configured to determine the quantity of the wireless communication devices that are within the distance threshold of the macrocell base station based on round trip delay measurements.

16. The system of claim 11 wherein the macrocell base station configured to transfer the additional wireless communication signals at the second power level during the second set of the time slots to at least some of the wireless communication devices if the quantity exceeds the quantity threshold comprises the macrocell base station configured to transfer the additional wireless communication signals to the wireless communication devices that are within the distance threshold of the macrocell base station.

17. The system of claim 11 wherein the picocell base stations and the macrocell base station have overlapping coverage areas.

18. The system of claim 11 wherein the macrocell base station has a greater range of coverage than the picocell base stations.

19. The system of claim 11 wherein the first power level comprises a maximum power level of the macrocell base station.

20. A method of operating a wireless communication system, wherein picocell base stations inhibit wireless communications during a first set of time slots and transfer the wireless communications during a second set of the time slots, the method comprising:

in a macrocell base station, transferring wireless communication signals at a first power level to a plurality of wireless communication devices during the first set of the time slots;

in a communication control system, determining if a total quantity of the wireless communication devices exceed a total quantity threshold;

in the communication control system, if the total quantity of the wireless communication devices exceed the total quantity threshold, determining a quantity of the wireless communication devices that are within a distance threshold of the macrocell base station; and in the macrocell base station, transferring additional wireless communication signals at a second power level during the second set of the time slots to the wireless communication devices that are within the distance threshold of the macrocell base station if the quantity exceeds a quantity threshold, wherein the second power level is lower than the first power level.

* * * * *